United States Patent
Li et al.

(10) Patent No.: US 11,335,102 B2
(45) Date of Patent: May 17, 2022

(54) METHODS AND SYSTEMS FOR LANE LINE IDENTIFICATION

(71) Applicant: ZHEJIANG DAHUA TECHNOLOGY CO., LTD., Zhejiang (CN)

(72) Inventors: Qiankun Li, Hangzhou (CN); Wei Lu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/169,596

(22) Filed: Feb. 8, 2021

(65) Prior Publication Data

US 2021/0174098 A1    Jun. 10, 2021

Related U.S. Application Data

(63) Continuation of application No. PCT/CN2019/089760, filed on Jun. 3, 2019.

(30) Foreign Application Priority Data

Aug. 9, 2018 (CN) .......................... 201810900902.9

(51) Int. Cl.
   *G06K 9/00* (2022.01)
   *G06V 20/56* (2022.01)
   *G06T 7/536* (2017.01)

(52) U.S. Cl.
   CPC ............ *G06V 20/588* (2022.01); *G06T 7/536* (2017.01); *G06T 2207/30256* (2013.01)

(58) Field of Classification Search
   None
   See application file for complete search history.

(56) References Cited

U.S. PATENT DOCUMENTS

| | | | |
|---|---|---|---|
| 8,358,808 B2 * | 1/2013 | Malinovskiy | G06K 9/00785 382/103 |
| 2007/0225895 A1 * | 9/2007 | Ma | G08G 1/04 701/117 |

(Continued)

FOREIGN PATENT DOCUMENTS

| | | |
|---|---|---|
| CN | 104063877 A | 9/2014 |
| CN | 105005771 A | 10/2015 |

(Continued)

OTHER PUBLICATIONS

The Extended European Search Report in European Application No. 19848186.3 dated Jul. 22, 2021, 10 pages.

(Continued)

*Primary Examiner* — Shervin K Nakhjavan
(74) *Attorney, Agent, or Firm* — Metis IP LLC

(57) ABSTRACT

The present disclosure provides a method for identifying a plurality of lane lines on a road segment. The method may include obtaining a plurality of images of the road segment having one or more lanes and vehicles, and identifying a plurality of reference straight lines from the images. The method may include determining a vanishing point based on the reference straight lines, and determining a plurality of candidate lane lines among the reference straight lines based on the vanishing point. The method may also include determining at least one travel trajectory of at least one of the vehicles based on the images. The method may further include determining a target travel trajectory among the travel trajectory based on the vanishing point or a count of the lanes, and determining the lane lines among the candidate lane lines based on the target travel trajectory.

20 Claims, 8 Drawing Sheets

(56) References Cited

U.S. PATENT DOCUMENTS

| | | | |
|---|---|---|---|
| 2009/0167864 A1 | 7/2009 | Unoura | |
| 2010/0033571 A1* | 2/2010 | Fujita | B60W 40/02 348/149 |
| 2010/0322476 A1* | 12/2010 | Kanhere | G06T 7/254 382/103 |
| 2011/0298988 A1* | 12/2011 | Kawai | G06T 5/006 348/699 |
| 2013/0300870 A1* | 11/2013 | Messely | G01S 7/4026 348/148 |
| 2014/0063252 A1 | 3/2014 | Zhao et al. | |
| 2014/0195138 A1* | 7/2014 | Stelzig | G08G 1/0116 701/119 |
| 2014/0216509 A1 | 8/2014 | Kondo et al. | |

FOREIGN PATENT DOCUMENTS

| | | |
|---|---|---|
| CN | 105468485 A | 4/2016 |
| CN | 105893949 A | 8/2016 |
| CN | 106570446 A | 4/2017 |
| CN | 107480592 A | 12/2017 |

OTHER PUBLICATIONS

Tian, Youjin et al., A Robust Lane Detection Method Based on Vanishing Point Estimation, Procedia Computer Science, 2018, 7 pages.

Ju Han Yoo et al., A Robust Lane Detection Method Based on Vanishing Point Estimation Using the Relevance of Line Segments, IEEE Transactions on Intelligent Transportation Systems, 18(12): 3254-3266, 2017.

International Search Report in PCT/CN2019/089760 dated Aug. 27, 2019, 4 pages.

Written Opinion in PCT/CN2019/089760 dated Aug. 27, 2019, 4 pages.

First Office Action in Chinese Application No. 201810900902.9 dated May 28, 2020, 11 pages.

Zhu, Jia et al., Lane Extraction Method Based on Vehicle Average Trajectory, Computer Engineering, 2012, 4 pages.

Zhang, Jieying et al., Lane Detection and Classification Based on Vehicle Trajectory, Image and Graphics Technology and Application Progress—Proceedings of the Third Conference on Image and Graphics Technology and Application Technology, 2008, 6 pages Melo, J. et al., Detection and Classification of Highway Lanes Using Vehicle Motion Trajectories, IEEE Transactions on Intelligent Transportation Systems, 7(2): 188-200, 2006.

Chen, Zezhi et al., Lane Detection by Trajectory Clustering in Urban Environments, 2014 IEEE 17th international Conference on Intelligent Transportation Systems, 2014, 6 pages.

* cited by examiner

600

600

METHODS AND SYSTEMS FOR LANE LINE IDENTIFICATION

CROSS-REFERENCE TO RELATED APPLICATIONS

This application is a continuation of International Patent Application PCT/CN2019/089760, filed on Jun. 3, 2019, which claims priority of Chinese Application No. 201810900902.9, filed on Aug. 9, 2018, the entire contents of which are hereby incorporated by reference.

TECHNICAL FIELD

The present disclosure generally relates to image processing, and more specifically relates to methods and systems for identifying a lane line in an image of a road segment.

BACKGROUND

Lane line identification is often needed in traffic monitoring and/or driving assistance. For example, a plurality of lane lines on a road segment (e.g., a high way, a crossroad) needs to be identified in an image of the road segment to provide a basis for detecting vehicle violations. At present, lane line identification is usually performed manually, or based on a trained lane line identification model (e.g., a convolutional neural network), or utilizing a line detection algorithm. However, the manual lane line identification is time-consuming and inefficient. The trained line identification model, which is trained based on a set of training images, may have a limited accuracy and/or efficiency in detecting lane lines in a scenario which is not included in the set of training images. The line detection algorithm may be likely to determine a long white strip, such as a white railing and a streetlight pole on the road segment as a lane line. Therefore, it is desirable to provide effective systems and methods for lane line identification.

SUMMARY

According to one aspect of the present disclosure, a system for identifying a plurality of lane lines on a road segment is provided. The system may include at least one storage medium storing a set of instructions, and at least one processor in communication with the at least one storage medium. When executing the instructions, the at least one processor may be configured to direct the system to perform the following operations. The at least one processor may be configured to direct the system to obtain a plurality of images of the road segment captured by an image acquisition device mounted above the road segment. The road segment may have one or more lanes and one or more vehicles travelling on the road segment. The at least one processor may be configured to direct the system to identify a plurality of reference straight lines from a target image of the plurality of images of the road segment. The at least one processor may also be configured to direct the system to determine a vanishing point at which the plurality of lane lines intersect in the target image based on the plurality of reference straight lines. The at least one processor may be configured to direct the system to determine a plurality of candidate lane lines among the plurality of reference straight lines based on the vanishing point, and determine at least one travel trajectory of at least one of the one or more vehicles based on the plurality of images. The at least one processor may further be configured to direct the system to determine one or more target travel trajectories among the at least one travel trajectory based on at least one of the vanishing point or a count of the one or more lanes. The at least one processor may further be configured to direct the system to determine the plurality of lane lines among the plurality of candidate lane lines based on the at least one target travel trajectory.

In some embodiments, to determine the vanishing point based on the plurality of reference straight lines, the at least one processor may be further configured to direct the system to determine a plurality of intersecting points between the plurality of reference straight lines. For each of the plurality of intersecting points, the at least one processor may be further configured to direct the system to determine a distance from the intersecting point to each of the plurality of reference straight lines. The at least one processor may be further configured to direct the system to determine the vanishing point based on the distances from the intersecting points to the plurality of reference straight lines.

In some embodiments, for each of the plurality of intersecting points, to determine the vanishing point based on the distances from the intersecting points to the plurality of reference straight lines, the at least one processor may be further configured to direct the system to determine a plurality of target straight lines among the plurality of reference straight lines. A distance from the intersecting point to each of the corresponding target straight lines may be smaller than a first threshold distance. The at least one processor may be also configured to direct the system to identify an intersecting point that corresponds to the most target straight lines among the plurality of intersecting points, and designate the identified intersecting point as the vanishing point.

In some embodiments, to determine the plurality of candidate lane lines based on the vanishing point, the at least one processor may be further configured to direct the system to designate the target straight lines corresponding to the vanishing point as the candidate lane lines.

In some embodiments, to determine one or more target travel trajectories among the at least one travel trajectory, the at least one processor may be further configured to direct the system to perform one or more first iterations. Each current first iteration of the one or more first iterations may comprise dividing the at least one travel trajectory in the current first iteration into one or more subgroups, each of the one or more subgroups corresponding to a lane of the one or more lanes. Each current first iteration may comprise selecting a travel trajectory from each of the one or more subgroups, and determining whether a count of the one or more selected travel trajectories is equal to the count of the one or more lanes. In response to a determination that the count of the one or more selected travel trajectories is equal to the count of the one or more lanes, each current first may further comprise designating the one or more selected travel trajectories as the one or more target travel trajectories.

In some embodiments, in response to a determination that the count of the one or more selected travel trajectories is not equal to the count of the one or more lanes, each current first iteration may further comprise updating the plurality of images of the road segment, determining at least one updated travel trajectory based on the plurality of updated images, and designating the at least one updated travel trajectory as at least one travel trajectory in a next first iteration.

In some embodiments, to determine one or more target travel trajectories among the at least one travel trajectory, the at least one processor may be further configured to direct the system to perform one or more second iterations. Each current second iteration of the one or more second iterations may comprise selecting a test travel trajectory among the at least one travel trajectory in the current second iteration, and determining whether a distance between the test travel trajectory and the vanishing point is smaller than a second threshold distance. In response to a determination that the distance is smaller than the second threshold distance, each current second iteration may comprise designating the test travel trajectory as a target travel trajectory, and determining whether a total count of target travel trajectories is equal to the count of the one or more lanes. In response to a determination that the total count is equal to the count of the one or more lanes of the road segment, each current second iteration may comprise terminating the one or more second iterations.

In some embodiments, the at least one travel trajectory in the current second iteration may include a plurality of travel trajectories. In response to a determination that the total count is not equal to the count of the one or more lanes, each current second iteration may comprise selecting a new travel trajectory as a test travel trajectory in a next second iteration.

In some embodiments, to determine the plurality of lane lines among the plurality of candidate lane lines based on the one or more target travel trajectories, the at least one processor may be configured to direct the system to determine one or more characteristic points of the one or more lanes of the road segment. The one or more characteristic points may be one or more intersecting points between a bottom edge of the target image and the one or more target travel trajectories. The at least one processor may be configured to direct the system to determine a plurality of target characteristic points of the one or more lanes based on the one or more characteristic points, and determine the plurality of lane lines among the plurality of candidate lane lines based on the plurality of target characteristic points.

In some embodiments, for each of the plurality of target characteristic points, to determine the plurality of lane lines among the plurality of candidate lane lines based on the plurality of target characteristic points, the at least one processor may be configured to direct the system to determine a distance from each of the candidate lane lines to the target characteristic point. For each of the plurality of target characteristic points, the at least one processor may be configured to direct the system to select a candidate lane line that has the shortest distance to the target characteristic point among the plurality of candidate lane lines. The at least one processor may be also configured to direct the system to designate the plurality of selected candidate lane lines as the plurality of lane lines.

In some embodiments, the one or more characteristic points may include a plurality of characteristic points. For each pair of adjacent characteristic points of the plurality of characteristic points, to determine the plurality of target characteristic points based on the plurality of characteristic points, the at least one processor may be configured to direct the system to determine a middle point of the pair of adjacent characteristic points. For a first characteristic point closest to a left edge of the target image among the characteristic points, the at least one processor may be configured to direct the system to determine a first point on the bottom edge of the target image. The first point may be located on a left side of the first characteristic point and spaced apart from the first characteristic point by a first predetermined distance. For a second characteristic point closest to a right edge of the target image among the characteristic points, the at least one processor may be configured to direct the system to determine a second point on the bottom edge of the target image. The second point may be located on a right side of the second characteristic point and spaced apart from the second characteristic point by a second predetermined distance. The at least one processor may be configured to direct the system to designate the one or more middle points, the first point, and the second point as the plurality of target characteristic points.

In some embodiments, the determining the vanishing point at which the plurality of lane line intersect in the target travel trajectory may be based on a random sample consensus algorithm.

According to one aspect of the present disclosure, a method for identifying a plurality of lane lines on a road segment is provided. The method may include obtaining a plurality of images of the road segment captured by an image acquisition device mounted above the road segment. The road segment may have one or more lanes and one or more vehicles travelling on the road segment. The method may further include identifying a plurality of reference straight lines from a target image of the plurality of images of the road segment, and determining a vanishing point at which the plurality of lane lines intersect in the target image based on the plurality of reference straight lines. The method may further include determining a plurality of candidate lane lines based on the vanishing point among the plurality of reference straight lines, and determining at least one travel trajectory of at least one of the one or more vehicles based on the plurality of images. The method may also include determining one or more target travel trajectories among the at least one travel trajectory based on at least one of the vanishing point or a count of the one or more lanes, and determining the plurality of lane lines based on the at least one target travel trajectory among the plurality of candidate lane lines.

According to still another aspect of the present disclosure, a non-transitory computer-readable storage medium comprising at least one set of instructions for identifying a plurality of lane lines on a road segment is provided. When executed by at least one processor of a system, the at least one set of instructions directs the system to perform a method. The method may include obtaining a plurality of images of the road segment captured by an image acquisition device mounted above the road segment. The road segment may have one or more lanes and one or more vehicles travelling on the road segment. The method may further include identifying a plurality of reference straight lines from a target image of the plurality of images of the road segment, and determining a vanishing point at which the plurality of lane lines intersect in the target image based on the plurality of reference straight lines. The method may further include determining a plurality of candidate lane lines based on the vanishing point among the plurality of reference straight lines, and determining at least one travel trajectory of at least one of the one or more vehicles based on the plurality of images. The method may also include determining one or more target travel trajectories among the at least one travel trajectory based on at least one of the vanishing point or a count of the one or more lanes, and determining the plurality of lane lines based on the at least one target travel trajectory among the plurality of candidate lane lines.

According to another aspect of the present disclosure, a system for identifying a plurality of lane lines on a road segment may be provided. The system may include an obtaining module, a straight line identification module, a vanishing point determination module, a travel trajectory determination module, and a lane line determination module. The obtaining module may be configured to obtain a plurality of images of the road segment captured by an image acquisition device mounted above the road segment. The road segment may have one or more lanes and one or more vehicles travelling on the road segment. The straight line identification module may be configured to identify a plurality of reference straight lines from a target image of the plurality of images of the road segment. The vanishing point determination module may be configured to determine a vanishing point at which the plurality of lane lines intersect in the target image based on the plurality of reference straight lines. The travel trajectory determination module may be configured to determine at least one travel trajectory of at least one of the one or more vehicles based on the plurality of images, and determine one or more target travel trajectories among the at least one travel trajectory based on at least one of the vanishing point or a count of the one or more lanes. The lane line determination module may be configured to determine a plurality of candidate lane lines based on the vanishing point among the plurality of reference straight lines, and determine the plurality of lane lines based on the at least one target travel trajectory among the plurality of candidate lane lines.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of example embodiments. These example embodiments are described in detail with reference to the drawings. These embodiments are non-limiting example embodiments, in which like reference numerals represent similar structures throughout the several views of the drawings, and wherein.

DETAILED DESCRIPTION

Figure 1:
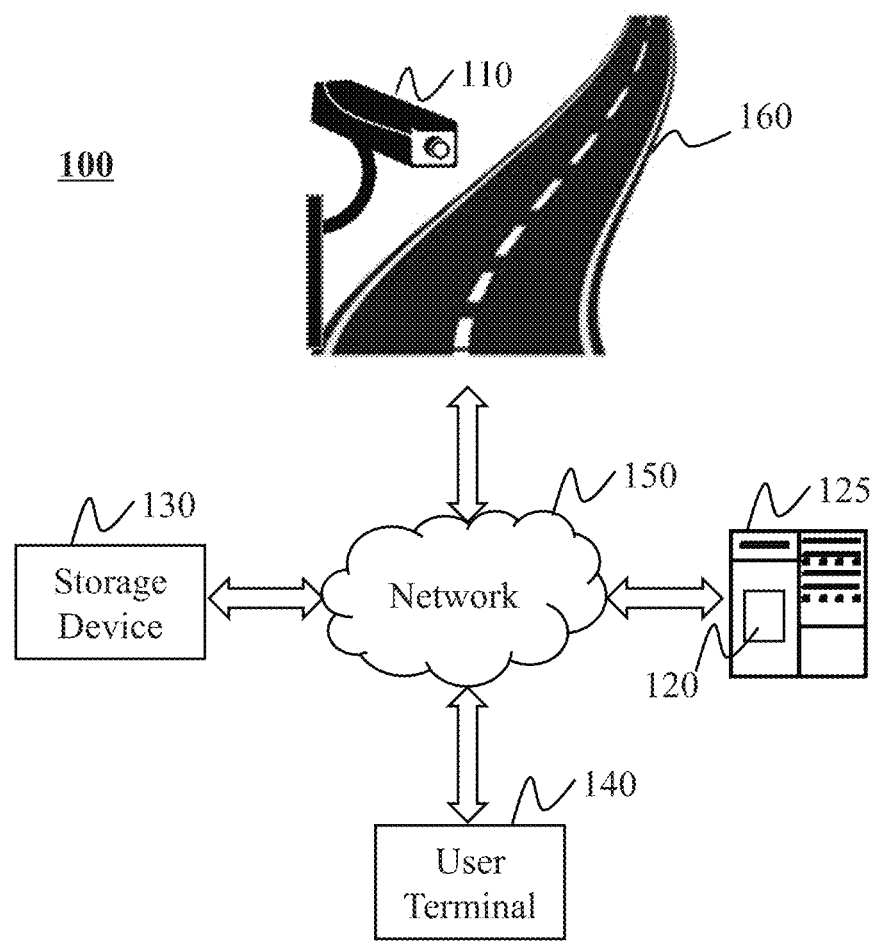
FIG. 1 is a block diagram illustrating an example lane line identification system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expression if they achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to systems and methods for identifying a plurality of lane lines of a road segment based on images of the road segment. The systems and methods may obtain a plurality of images of the road segment captured by an image acquisition device mounted above the road segment. The road segment may have one or more lanes and one or more vehicles travelling on the road segment. The systems and methods may also identify a plurality of reference straight lines from a target image of the plurality of images of the road segment. The systems and methods may further determine a vanishing point at which the plurality of parallel lane lines intersect based on the plurality of reference straight lines. The systems and methods may also determine a plurality of candidate lane lines among the plurality of reference straight lines based on the vanishing point, and determine at least one travel trajectory of at least one of the one or more vehicles based on the plurality of images. The systems and methods may further determine one or more target travel trajectories among the at least one travel trajectory based on the vanishing point and optionally a total number of lanes (Nn) to be recognized by the system and methods disclosed herein. Then, the systems and methods may determine the plurality of lane lines among the plurality of candidate lane lines based on the at least one target travel trajectory.

According to some embodiments of the present disclosure, the lane lines of the road segment may be identified automatically by analyzing the plurality of images of the road segment. Compared with identifying the lane line manually or according to a trained lane line identification model, the lane line identification technique disclosed in the present disclosure is more accurate, efficient, and can be applied to images taken in various scenarios.

FIG. 1 is a block diagram illustrating an example lane line identification system 100 according to some embodiments of the present disclosure. The lane line identification system 100 may be used to perform lane line identification on a road segment 160. The road segment 160 may be a segment of a road, such as a highway, an avenue, a parkway, an elevated road, or any other type of road. The road segment 160 may include one or more lanes. A lane may refer to a part of a road that is designated to be used by a single line of vehicles, to control and guide drivers and reduce traffic conflicts. The one or more lanes of the road segment 160 may be marked by a plurality of lane lines. The lane lines may include a solid line, a dotted line, a double line, etc. In some embodiments, the lane line identification system 100 may be applied in various areas, such as a traffic management system, a transportation system, a security system, a monitoring system, a driving assistance system, a navigation system, or the like, or any combination thereof.

As illustrated in FIG. 1, the lane line identification system 100 may include an image acquisition device 110, a server 125, a storage device 130, a user terminal 140, and a network 150.

The image acquisition device 110 may be and/or include any suitable device that is capable of acquiring image data. Example image acquisition device 110 may include a camera, a video recorder, a scanner, a mobile phone, a tablet computing device, a wearable computing device, an infrared imaging device (e.g., a thermal imaging device), or the like, or any combination thereof. In some embodiments, the image acquisition device 110 may be a camera, such as a spherical camera, a stereo camera, a digital camera, an analog camera, an IP camera (IPC), etc. The digital camera may include a 2D camera, a 3D camera, a panoramic camera, a virtual reality (VR) camera, a web camera, an instant picture camera, or the like, or any combination thereof. In some embodiments, the digital camera may be added to or be part of a night vision equipment, a radar system, a sonar system, an electronic eye, a camcorder, a thermal imaging device, a smartphone, a tablet PC, a laptop, a wearable device (e.g., 3D glasses), an eye of a robot, or the like, or any combination thereof. The digital camera may also include an optical sensor, a radio detector, an artificial retina, a mirror, a telescopes, a microscope, or the like, or any combination thereof.

The image data acquired by the image acquisition device 110 may include an image, a video, or any data about a video and/or an image, such as values of one or more pixels (or referred to as pixel values) of an image (e.g., luma, gray values, intensities, chrominance, contrast of one or more pixels of an image), RGB data, audio information, timing information, location data, etc. In some embodiments, the image acquisition device 110 may include a charge-coupled device (CCD), a complementary metal-oxide-semiconductor (CMOS) sensor, an N-type metal-oxide-semiconductor (NMOS), a contact image sensor (CIS), and/or any other suitable image sensor.

In some embodiments, the image acquisition device 110 may be mounted above the road segment 160 as illustrated in FIG. 1 and configured to capture image data (e.g., an image and/or a video) of the road segment 160. The image acquisition device 110 may be mounted above the road segment 160 using any suitable mounting mechanism. For example, the image acquisition device 110 may be mounted on the top of a gantry or a portal frame on the road segment 160. The image data of the road segment 160 captured by the image acquisition device 110 may include one or more objects on the road segment 160. The object(s) on the road segment 160 may include a moving object and/or a still object. For example, the object(s) may include a still vehicle, a moving vehicle, a passenger, a traffic light, a traffic sign, or the like, or any combination thereof. In some embodiments, the image acquisition device 110 may continuously or intermittently (e.g., periodically or irregularly) capture image data of the road segment 160. Optionally, the image data may be transmitted to one or more components of the lane line identification system 100, such as the server 125, the storage device 130, and/or the user terminal 140 for processing, storing, and/or display.

In some embodiments, the image acquisition device 110 may be configured to acquire a plurality of images of the road segment 160, wherein the plurality of images may be used to identify the plurality of lane lines on the road segment 160. The images may be acquired by the image acquisition device 110 consecutively or inconsecutively. In some embodiments, the image acquisition device 110 may capture the plurality of images with a same (or substantially same) field of view (FOV), such that the images are related to a same area on the road segment 160. Additionally or alternatively, the image acquisition device 110 may capture the images under one or more fixed internal parameters and/or one or more fixed external parameters. Details regarding the images of the road segment 160 may be found elsewhere in the present disclosure (e.g., operation 510 and the relevant descriptions thereof).

The server 125 may be configured to process information and/or data relating to the lane line identification system 100 to perform one or more functions described in the present disclosure. For example, the server 125 may process image data of the road segment 160 acquired by the image acquisition device 110 to identify the lane lines on the road segment 160. The server 125 may be a single server or a server group. The server group may be centralized, or distributed (e.g., the server 125 may be a distributed system). In some embodiments, the server 125 may be local or remote. For example, the server 125 may access information and/or data stored in the image acquisition device 110, and/or the storage device 130 via the network 150. As another example, the server 125 may be directly connected to the image acquisition device 110 and/or the storage device 130 to access stored information and/or data. In some embodiments, the server 125 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 125 (or a portion thereof) may be implemented on a computing device 200 having one or more components illustrated in FIG. 2 of the present disclosure.

In some embodiments, the server 125 may include a processing device 120. According to some embodiments of the present disclosure, the processing device 120 may process information and/or data related to the lane line identification system 100 to perform one or more functions described in the present disclosure. For example, the processing device 120 may acquire image data of the road segment 160 from the one or more components of the lane line identification system 100, such as the image acquisition device 110, the storage device 130 via the network 150. The processing device 120 may further identify a plurality of lane lines on the road segment 160 by analyzing the image data.

In some embodiments, the processing device 120 may include one or more processors (e.g., single-core processor(s) or multi-core processor(s)) to perform operations disclosed in this disclosure. The processor(s) may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, the processing device 120 may include a microprocessor to process a video/image captured by the image acquisition device 110.

The storage device 130 may be configured to store data and/or instructions. In some embodiments, the data and/or instructions may be obtained from, for example, the image acquisition device 110, the processing device 120, the user terminal 140, and/or other component(s) of the lane line identification system 100. In some embodiments, the storage device 130 may include a mass storage device, a removable storage device, a volatile read-and-write memory, a read-only memory (ROM), or the like, or any combination thereof. For example, the mass storage device may include a magnetic disk, an optical disk, a solid-state drives, etc. The removable storage device may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, storage device 130 may be configured to store one or more programs and/or instructions that may be executed by the server 125 of the lane line identification system 100 to perform example methods described in this disclosure. For example, the storage device 130 may be configured to store program(s) and/or instruction(s) executed by the server 125 to identify lane lines on the road segment 160.

In some embodiments, the storage device 130 may be connected to the network 150 to communicate with one or more components of the lane line identification system 100 (e.g., the server 125, the image acquisition device 110, etc.). One or more components of the lane line identification system 100 may access the data or instructions stored in the storage device 130 via the network 150. In some embodiments, the storage device 130 may be directly connected to or communicate with one or more components of the lane line identification system 100 (e.g., the server 125, the image acquisition device 110, etc.). In some embodiments, the storage device 130 may be part of the server 125 or the image acquisition device 110. In some embodiments, one or more components of the lane line identification system 100 (e.g., the server 125, the image acquisition device 110, etc.) may have a permission to access the storage device 130. In some embodiments, one or more components of the lane line identification system 100 may read and/or modify information stored in the storage device 130 when one or more conditions are met.

The user terminal 140 may be configured to enable a user interaction between a user and the lane line identification system 100. For example, the user terminal 140 may receive a lane line detection result from the processing device 120 and display the lane line detection result to a user. In some embodiments, the user terminal 140 may include a smart phone, a personal computer, a tablet, a laptop, a wearable device (e.g., a smart watch, a pair of smart glasses, or the like), or the like, or a combination thereof. In some embodiments, the user terminal 140 and the processing device 120 may be integrated in one device configured to perform example functions of the user terminal 140 and the processing device 120 disclosed in this disclosure.

The network 150 may be configured to facilitate communications among the components of the lane line identification system 100. In some embodiments, one or more components in the lane line identification system 100 (e.g., the server 125, the image acquisition device 110, and the storage device 130) may send information and/or data to another component(s) in the lane line identification system 100 via the network 150. For example, the image acquisition device 110 may transmit a plurality of captured images to the processing device 120 via the network 150. As another example, the processing device 120 may transmit a processing result to the user terminal 140 via the network 150.

In some embodiments, the network 150 may be any type of wired or wireless network, or combination thereof. For example, the network 150 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone network, a metropolitan area network (MAN), a wide area network (WAN), an internet area network (IAN, or cloud), or the like, or any combination thereof. In some embodiments, the image acquisition device 110, the processing device 120, the storage device 130, the user terminal 140, and/or the network 150 may be connected to or communicate with each other directly or indirectly.

It should be understood that, the components of the lane line identification system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware (e.g., the processor 220 illustrated in FIG. 2). Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

It should be noted that the above description of the lane line identification system 100 is merely provided for the purposes of illustration and not intended to limit the scope of the present disclosure. For persons having ordinary skills in the art, multiple variations or modifications may be made under the teachings of the present disclosure. However, those variations and modifications do not depart from the scope of the present disclosure. For example, the lane line identification system 100 may include one or more additional components not mentioned above, and/or one or more components mentioned above may be omitted. For example, two or more of the components of the lane line identification system 100 may be integrated into a single device. For example, the processing device 120 and/or the storage device 130 may be integrated into the image acquisition device 110. In some embodiments, the components of the lane line identification system 100 may be located remotely from each other.

Figure 2:
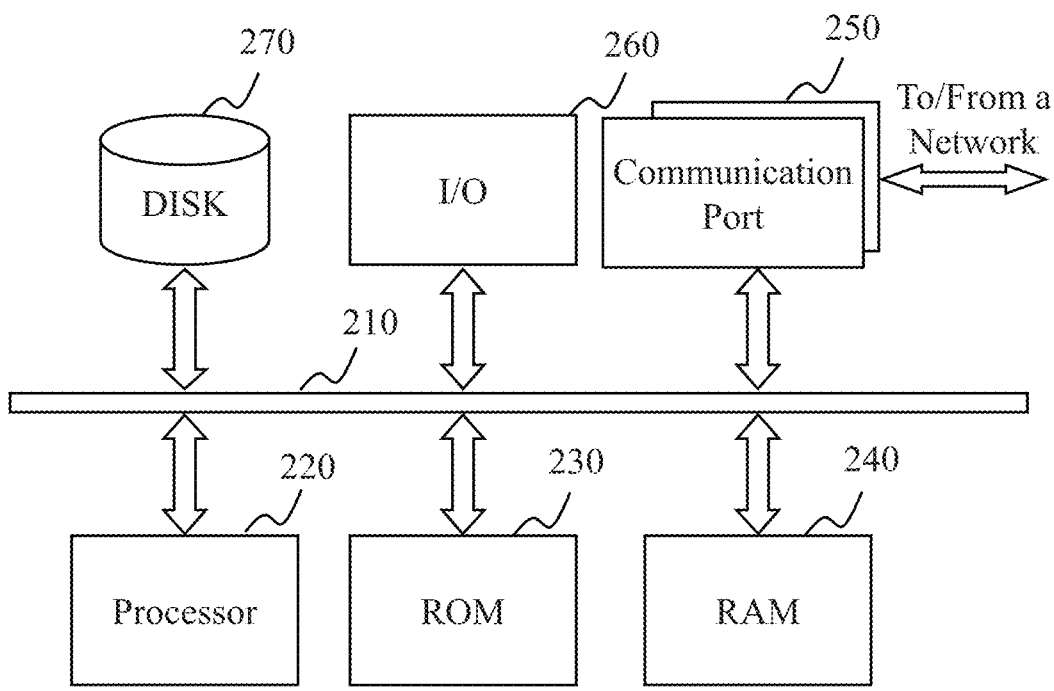
FIG. 2 a schematic diagram illustrating example hardware and software components of a processing device according to some embodiments of the present disclosure.

FIG. 2 is a schematic diagram illustrating example hardware and software components of a computing device 200 according to some embodiments of the present disclosure.

The computing device 200 may be a general purpose computer or a special purpose computer. Both may be used to implement the lane line identification system 100 of the present disclosure. The computing device 200 may be used to implement any component of the lane line identification system 100 as described herein. For example, the processing device 120 of the lane line identification system 100 and/or the user terminal 140 may be implemented on the computing device 200, via its hardware, software program, firmware, or a combination thereof. Although only one such computer is shown for convenience, the computer functions related to the lane line identification system 100 as described herein may be implemented in a distributed manner on a number of similar platforms to distribute the processing load.

The computing device 200, for example, may include a communication port 250 connected to a network (e.g., the network 150) to facilitate data communications. The computing device 200 may also include a processor 220, in the form of one or more processors, for executing program instructions. In some embodiments, the processor 220 may include interface circuits and processing circuits therein. The interface circuits may be configured to receive electronic signals from the communication port 250, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the communication port 250.

The computing device 200 may further include an internal communication bus 210, program storage and data storage of different forms, for example, a disk 270, and a read only memory (ROM) 230, or a random access memory (RAM) 240, for various data files to be processed and/or transmitted. The computing device 200 may also include program instructions stored in the ROM 230, the RAM 240, and/or other type of non-transitory storage medium to be executed by the processor 220. The methods and/or processes of the present disclosure may be implemented as the program instructions. The computing device 200 also includes an I/O 260, supporting input/output between the computer and other components therein. The computing device 200 may also receive programming and data via network communications.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, the processor of the computing device 200 executes both operation A and operation B. As in another example, operation A and operation B may also be performed by two different processors in the computing device 200 jointly or separately (e.g., the first processor executes operation A, and the second processor executes operation B; or the first and second processors jointly execute operations A and B).

Figure 3:
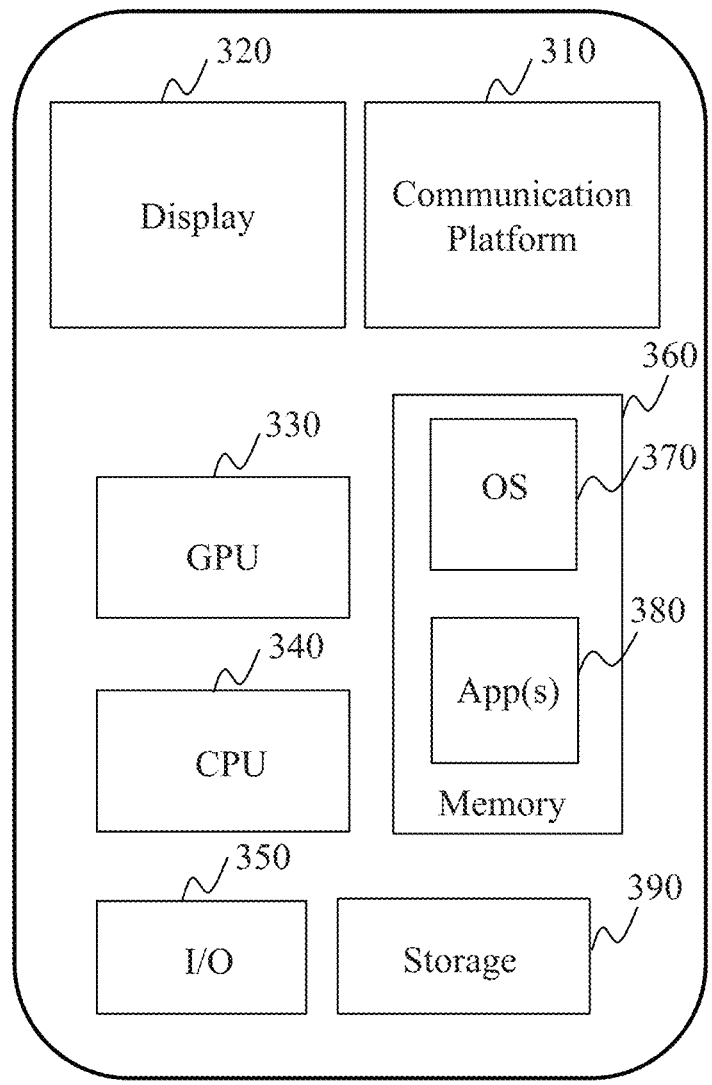
FIG. 3 is a schematic diagram illustrating example hardware and software components of a mobile device according to some embodiments of the present disclosure.

FIG. 3 is a schematic diagram illustrating example hardware and/or software components of an example mobile device 300 may be implemented according to some embodiments of the present disclosure. In some embodiments, one or more components (e.g., the user terminal 140, the processing device 120, and/or the image acquisition device 110) of the lane line identification system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to the lane line identification system 100. User interactions with the information stream may be achieved via the 1/O 350 and provided to the processing device 120 and/or other components of the lane line identification system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
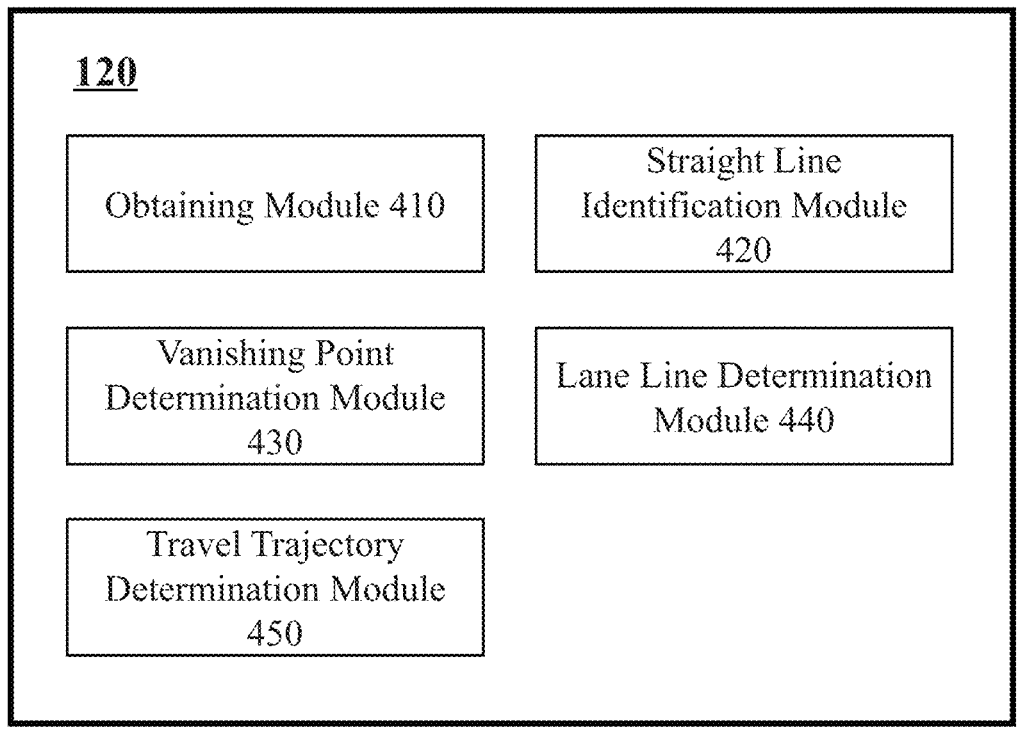
FIG. 4 is a block diagram illustrating an example processing device according to some embodiments of the present disclosure.

FIG. 4 is a block diagram illustrating an example processing device 120 according to some embodiments of the present disclosure. The processing device 120 may include an obtaining module 410, a straight line identification module 420, a vanishing point determination module 430, a lane line determination module 440, and a travel trajectory determination module 450. The processing device 120 may be implemented on various components (e.g., the computing device 200 as illustrated in FIG. 2, the mobile device 300 as illustrated in FIG. 3).

The obtaining module 410 may be configured to obtain information relating to the lane line identification system 100. For example, the obtaining module 410 may obtain a plurality of images of a road segment (e.g., the road segment 160). The road segment may include one or more lanes defined by a plurality of lane lines. The images of the road segment may be captured by an image acquisition device (e.g., the image acquisition device 110) mounted above the road segment. For example, the images may include a plurality of frames in a video captured by the image acquisition device during a preset time interval. The images of the road segment may be obtained from one or more components (e.g., the image acquisition device 110 and/or a storage device) of the lane line identification system 100 or an external source. Details regarding the obtaining of the images may be found elsewhere in the present disclosure (e.g., operation 510 and the relevant descriptions thereof).

The straight line identification module 420 may be configured to identify straight line(s) from an image. For example, the straight line identification module 420 may identify a plurality of reference straight lines from a target image of the plurality of images of the road segment. The target image may be an image selected from the images randomly or according to a preset rule. Details regarding the identification of the reference straight lines may be found elsewhere in the present disclosure (e.g., operation 515 and the relevant descriptions thereof).

The vanishing point determination module 430 may be configured to determine a vanishing point at which the lane lines intersect in the target image based on the reference straight lines. In some embodiments, the vanishing point determination module 430 may determine the vanishing point based on the reference straight lines using a random sample consensus (RANSAC) algorithm. Details regarding the determination of the vanishing point may be found elsewhere in the present disclosure (e.g., operation 520 and the relevant descriptions thereof).

The lane line determination module 440 may be configured to select a plurality of candidate lane lines based on the vanishing point among the reference straight lines. The lane line determination module 440 may further be configured to determine the plurality of lane lines among the plurality of candidate lane lines based on one or more target travel trajectories. Details regarding the determination of the candidate lane lines and the lane lines may be found elsewhere in the present disclosure (e.g., operations 525 and 560 and the relevant descriptions thereof).

The travel trajectory determination module 450 may be configured to determine at least one travel trajectory of at least one of one or more vehicles based on the plurality of images, and determine one or more target travel trajectories among the at least one travel trajectory. Details regarding the determination of the at least one travel trajectory and the one or more target travel trajectories and may be found elsewhere in the present disclosure (e.g., FIG. 5 and the relevant descriptions thereof).

It should be noted that the above descriptions of the processing device 120 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, one or more of the modules mentioned above may be omitted. In some embodiments, the processing device 120 may include one or more additional modules. In some embodiments, two or more of the modules mentioned above may be combined into a single module, and any one of the modules may be divided into two or more units. For example, the straight line identification module 420, the vanishing point determination module 430, and the lane line determination module 440 may be integrated into a single module. However, those variations and modifications also fall within the scope of the present disclosure.

Figure 5:
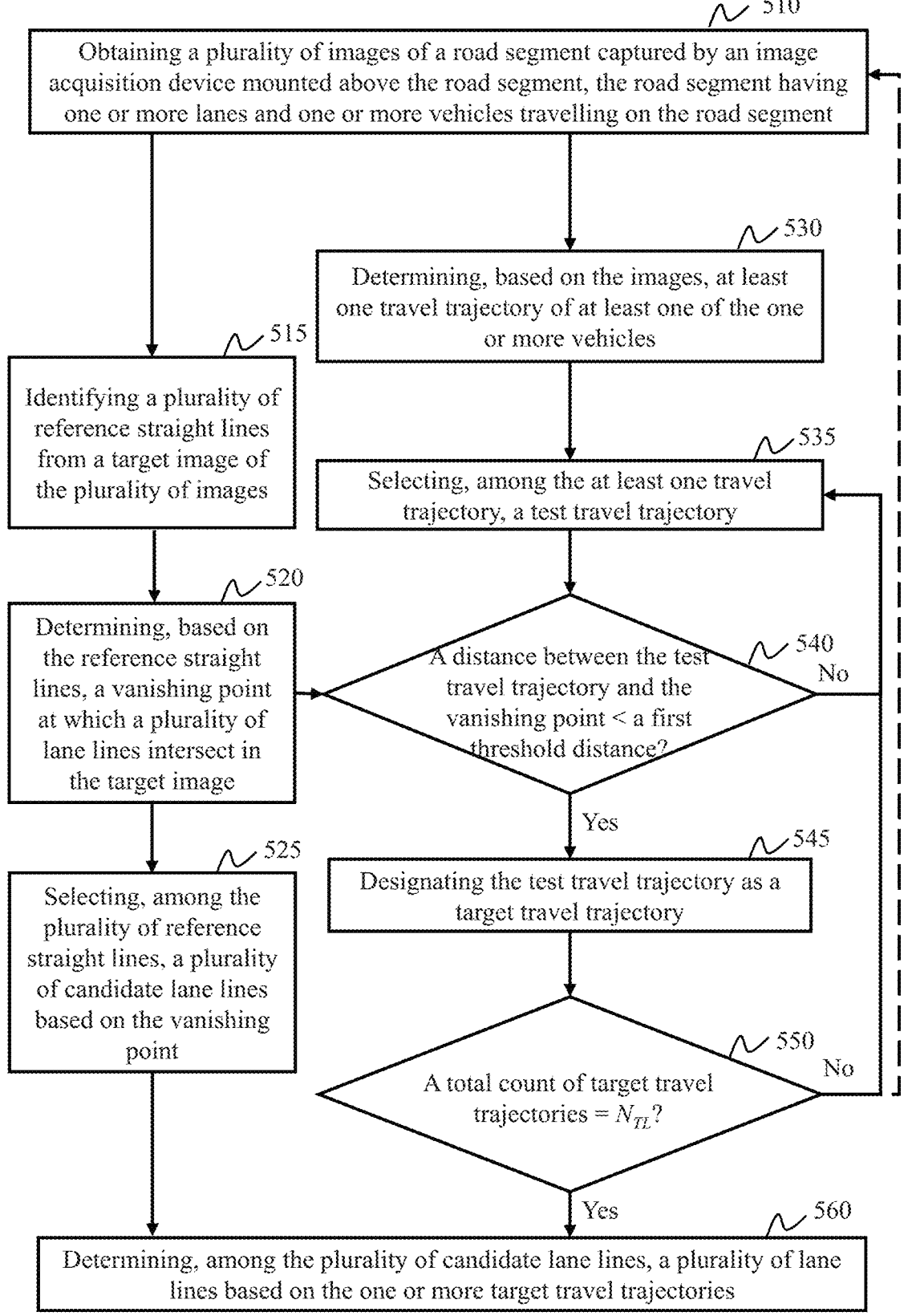
FIG. 5 is a flowchart illustrating an example process for identifying a plurality of lane lines on a road segment according to some embodiments of the present disclosure.

FIG. 5 is a flowchart illustrating an example process 500 for identifying a plurality of lane lines on a road segment according to some embodiments of the present disclosure. In some embodiments, at least part of the process 500 may be performed by the lane line identification system 100. For example, the process 500 may be stored in a storage device (e.g., the storage device 130, the storage 390, etc.) in the form of instructions (e.g., an application), and invoked and/or executed by the processing device 120 (e.g., the processor 220 of the computing device 200 as illustrated in FIG. 2, the CPU 340 of the mobile device 300 as illustrated in FIG. 3, and/or one or more modules as illustrated in FIG. 4).

In 510, the processing device 120 (e.g., the obtaining module 410) (e.g., the interface circuits of the processor 220) may obtain a plurality of images of a road segment (e.g., the road segment 160).

The road segment may have one or more lanes and one or more vehicles travelling on the road segment. The images of the road segment may be captured by an image acquisition device (e.g., the image acquisition device 110) mounted above the road segment. For example, the images may include a plurality of frames in a video captured by the image acquisition device during a preset time interval. In some embodiments, the obtained images may be captured by the image acquisition device consecutively or inconsecutively. The obtained images may include any number of images, such as 2 images, 5 images, 10 images, or the like.

In some embodiments, the image acquisition device may be mounted at a fixed location above the road segment (e.g., on the top of a gantry) and capture the images under one or more fixed internal parameters and/or one or more fixed external parameters. Example internal parameters may include a focal length, an optical axis center, a pixel size, etc. Example external parameters may include an orientation parameter (e.g., a pitch angle, a yaw angle, and/or a roll angle), a position parameter (e.g., a translation along a certain direction), etc. In some embodiments, the orientation of the image acquisition device may be consistent (e.g., parallel or substantially parallel) with an extension direction of the road segment when the images are captured, such that the lane lines in the images may interest with bottom edges of the images.

In some embodiments, the processing device 120 may obtain the images of the road segment from one or more components of the lane line identification system 100, such as the image acquisition device 110 and/or a storage device (e.g., the storage device 130, the ROM 230, the RAM 240) via a network (e.g., the network 150). For example, the processing device 120 may obtain the images of the road segment from the image acquisition device 110 in real time or periodically. Additionally or alternatively, the processing device 120 may obtain the images of the road segment from an external source (e.g., a traffic monitoring website or database) via a network (e.g., the network 150).

After the images of the road segment are obtained, the processing device 120 may determine a plurality of candidate lane lines and one or more target travel trajectories based on the images. For example, the processing device 120 may perform operations 515 to 525 to determine the candidate lane lines, and perform operations 530 to 550 to determine the one or more target travel trajectories. In some embodiments, the determination of the candidate lane lines and the determination of the one or more target travel trajectories may be performed in parallel, for example, by two processing units of the processing device 120. Alternatively, the determination of the candidate lane lines and the determination of the target travel trajectories may be performed in sequence, for example, by the processing device 120 or two processing units of the processing device 120.

In 515, the processing device 120 (e.g., the straight line identification module 420) (e.g., the processing circuits of the processor 220) may identify a plurality of reference straight lines from a target image of the plurality of images.

The target image may be an image selected from the images randomly or according to a preset rule. For example, the target image may be the first image captured by the image acquisition device among the images. As another example, the target image may be the first image that includes a vehicle captured by the image acquisition device among the images.

Figure 6:
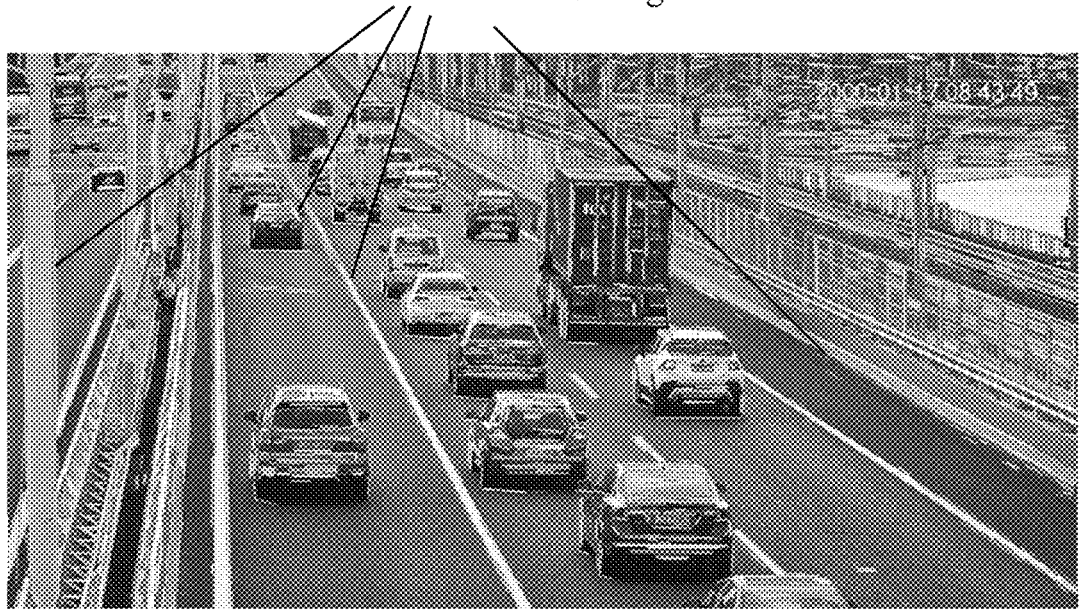
FIG. 6 is a target image illustrating example reference straight lines in the target image according to some embodiments of the present disclosure.

The reference straight lines may refer to a plurality of straight lines identified from the target image. For example, FIG. 6 illustrates a target image 600 including a plurality of example reference straight lines. The reference straight lines in the target image 600 may include a plurality of straight lines representing lane lines (or a portion of the lane lines) and other straight lines representing one or more other objects on the road segment, e.g., a street lamp, a guardrail, a vehicle, etc. In some embodiments, in the target image, the lane lines may be regarded as long straight lines (e.g., straight lines having lengths longer than a threshold length) that extends along a certain direction. For each lane line, a plurality of reference straight lines which are parallel or substantially parallel to each other may be identified to represent the lane line. In some embodiments, the processing device 120 may identify the reference straight lines from the target image using a line detection algorithm. Example line detection algorithms may include a line segment detection (LSD) algorithm, a Hough line detection algorithm, a convolution based detection algorithm, etc.

In some embodiments, each identified reference straight line may be represented by coordinates of two end points of the reference straight line or a vector in a preset coordinate system (e.g., a Cartesian coordinate system, a polar coordinate system, a homogeneous coordinate system). For example, the preset coordinate system may be a Cartesian coordinate system including an X-axis parallel with the bottom edge of the target image and a Y-axis perpendicular to the bottom edge of the target image. A reference straight line may be represented by a first coordinate $p(x_1, y_1)$ of a first end of the reference straight line and a second coordinate $q(x_2, y_2)$ of a second end of the reference straight line.

In 520, the processing device 120 (e.g., the vanishing point determination module 430) (e.g., the processing circuits of the processor 220) may determine a vanishing point at which the lane lines intersect in the target image based on the reference straight lines.

In some embodiments, the lane lines may be regarded as a plurality of parallel lines in space. The lane lines in the target image may intersect at a certain point according to a projection model. In the projection model, a straight line $P_l$ in a specific space may be expressed as an Equation (1) as below:

$$P_l = X + \lambda V, \qquad (1)$$

where V refers to a vector in the specific space, X refers to a point in the specific space, and $\lambda$ may be any real number. A plurality of straight lines parallel with $P_l$ may be determined based on the vector V and a plurality of points different from the point X. For a point P on the straight line $P_l$, its image rp on an image I (e.g., the target image) may be expressed as an Equation (2) as below:

$$r\tilde{p} = r\begin{bmatrix} x \\ y \\ 1 \end{bmatrix} = K[R\,T]\begin{bmatrix} P \\ 1 \end{bmatrix} = K[R - RC]\begin{bmatrix} X + \lambda V \\ 1 \end{bmatrix}, \qquad (2)$$

where $$\begin{bmatrix} x \\ y \\ 1 \end{bmatrix}$$

refers to a coordinate of P on the image I in a homogenous coordinate system, K refers to one or more internal parameters (e.g., a focal length, an optical axis center) of the image acquisition device when the image I is captured, R refers to one or more pose parameters (e.g., a pitch angle, a yaw angle, a roll angle) of the image acquisition device when the image I is captured, T refers to one or more translation parameters (e.g., a translation distance along a certain direction) of the image acquisition device when the image I is captured, and C refers to a coordinate of an optical center of the image acquisition device in the image I.

An Equation (3) may be derived when $\lambda$ is infinite:

$$\hat{p}_{vp} = \begin{bmatrix} x_{vp} \\ y_{vp} \\ 1 \end{bmatrix} = K[R - RC]\left(\begin{bmatrix} \frac{X}{\lambda} \\ 1 \\ \frac{1}{\lambda} \end{bmatrix} + \begin{bmatrix} v \\ 0 \end{bmatrix}\right) = K[R - RC]\begin{bmatrix} v \\ 0 \end{bmatrix} = KRV, \qquad (3)$$

where $p_{vp}$ represents a point, and $$\begin{bmatrix} x_{vp} \\ y_{vp} \\ 1 \end{bmatrix}$$

refers to a coordinate of $p_{vp}$.

Thus, according to the projection model, a plurality of parallel straight lines in space may intersect a certain point (e.g., $p_{vp}$) in an image of the parallel straight lines. For illustration purposes, a point at which the plurality of lane lines interest is referred to as vanishing point in the present disclosure. In some embodiments, the vanishing point may be a point illustrated in the target image. Alternatively, the vanishing point may be a point not illustrated in the target image, for example, be an intersecting point between extension lines of the lane lines.

In some embodiments, the processing device 120 may determine the vanishing point based on the reference straight lines using a random sample consensus (RANSAC) algorithm. The RANSAC algorithm may be an iterative algorithm to estimate one or more parameters of a mathematical model from a set of observed data that contains outliers. In some embodiments, the processing device 120 may determine a plurality of intersecting points between the reference straight lines. For example, the processing device 120 may determine a plurality of pairs of unparallel reference straight lines among the reference straight lines. The processing device 120 may further determine an intersecting point between each pair of unparallel reference straight lines. For each of the intersecting points, the processing device 120 may then determine a distance from the intersecting point to each reference straight line. A distance from an intersecting point to a reference straight line may refer to a perpendicular distance between the intersecting point and the reference straight line. Further, the processing device 120 may determine the vanishing point based on the distances from the intersecting points to the reference straight lines. For example, for each intersecting point, the processing device 120 may determine a plurality of target straight lines among the reference straight lines, wherein a distance from the intersecting point to each corresponding target straight line may be smaller than a first threshold distance. The first threshold distance may have any suitable value. For example, the first threshold distance may be equal to 5 pixels, 10 pixels, 15 pixels, 20 pixels, 25 pixels, or the like. In some embodiments, the first threshold distance may be in a range of 10 pixels to 15 pixels. The first threshold distance may be a default setting of the lane line identification system 100 or be set by a user manually. Alternatively, the first threshold distance may be determined by the processing device 120 according to different situations. The processing device 120 may then identify an intersecting point that corresponds to the most target straight lines among the intersecting points, and designate the identified intersecting point as the vanishing point.

In 525, the processing device 120 (e.g., the lane line determination module 440) (e.g., the processing circuits of the processor 220) may select a plurality of candidate lane lines based on the vanishing point among the reference straight lines.

Figure 7:
FIG. 7 is the target image of FIG. 6 illustrating example candidate lane lines in the target image according to some embodiments of the present disclosure.

In some embodiments, as described in connection with the operation 520, an intersecting point that corresponds to the most target straight lines may be determined as the vanishing point. The processing device 120 may designate the target straight lines corresponding to the vanishing point as the plurality of candidate lane lines. The distance between each target straight line corresponding to the vanishing point (i.e., each candidate lane line) to the vanishing point may be or smaller than the first threshold distance. Optionally, the processing device 120 may designate a selected portion of the target straight lines corresponding to the vanishing point as the candidate lane lines. For example, the selected portion may include a plurality of target straight lines corresponding to the vanishing point and having a distance to the vanishing point below another threshold distance (which is smaller than the first threshold distance). For example, FIG. 7 illustrate a plurality of exemplary candidate lane lines in the target image 600. A distance between each candidate lane lines in the target image 600 and a vanishing point (not shown in FIG. 7) may be smaller than the first threshold distance.

As described in connection with 515, each lane line may correspond to a plurality of parallel or substantially parallel reference straight lines. Theoretically, the reference straight lines representing the lane lines may all intersect at the vanishing point. In reality, due to measurement and calculation error, not all reference straight lines representing the lane lines may interest at the vanishing point. For each intersecting point, the present disclosure may determine the target straight lines that have a distance to the intersecting point below than the first threshold distance. The target straight lines corresponding to an intersecting point may be regarded as intersecting at the intersecting point. The processing device 120 may determine the intersecting point that corresponds to most target straight lines as the vanishing point, and designate the target straight lines of the vanishing point as the candidate lane lines. This may reduce the influence of the measurement and calculation error, and avoid an omission of candidate lane lines.

In 530, the processing device 120 (e.g., the travel trajectory determination module 450) (e.g., the processing circuits of the processor 220) may determine at least one travel trajectory of at least one of the one or more vehicles based on the plurality of images.

In some embodiments, the processing device 120 may perform a vehicle detection on the images of the road segment to identify the one or more vehicles from the images. Taking a certain image as an instance, the processing device 120 may perform the vehicle detection on the certain image using an object detection technique, such as a template matching technique, a machine learning-based technique, etc. A vehicle detected in the certain image may be represented by a coordinate of the vehicle in the image or a coordinate system (e.g., the preset coordinate system as described in connection with operation 515). A coordinate of a vehicle in the coordinate system may refer to a coordinate of any point of the vehicle (e.g., a center point of the vehicle or a midpoint of a bottom of the vehicle) in the coordinate system.

After the vehicle(s) are identified, the processing device 120 may determine at least one travel trajectory of at least one of the one or more vehicles. In some embodiments, there may be a plurality of vehicles on the road segment. The at least one vehicle may include all or a selected portion of the vehicles on the road segment. For example, the processing device 120 may select the first vehicle that appears in the plurality of images as the at least one vehicle. As another example, the processing device 120 may select a vehicle that appears in two or more images among the plurality of images as the at least one vehicle. As yet another example, the processing device 120 may randomly select a certain number of vehicles among the vehicles on the road segment as the at least one vehicle.

In some embodiments, for each of the at least one vehicle, the processing device 120 may determine a travel trajectory of the vehicle based on the coordinates of the vehicle in the images. Merely by way of example, for a certain vehicle A, the processing device 120 may determine a travel trajectory of the vehicle A based on a first image and a second image among the images, wherein the vehicle A appears in both of the first and second images. The vehicle A in the first image and the second image may be determined in vehicle detection as described above and represented by a first coordinate and a second coordinate, respectively. In some embodiments, the first and second coordinates may be coordinates in the same coordinate system. The processing device 120 may determine a straight line connecting the first coordinate and the second coordinate as the travel trajectory of the vehicle A. Alternatively, the first and second coordinates may be coordinates in different coordinate systems. For example, the first coordinate may be a coordinate in the first image, and the second coordinate may be a coordinate in the second image. The processing device 120 may map the second coordinate onto the first image to obtain a third coordinate in the first image. The processing device 120 may further determine a straight line connecting the first coordinate and the third coordinate as the travel trajectory of the vehicle A.

After the at least one travel trajectory is determined, the processing device 120 (e.g., the travel trajectory determination module 450) may determine one or more target travel trajectories among the at least one travel trajectory. In some embodiments, the at least one travel trajectory may include a plurality of travel trajectories. The one or more target travel trajectories may include all or a selected portion of the plurality of travel trajectories. For example, the one or more target travel trajectories may include one or more travel trajectories randomly selected from the plurality of travel trajectories. In some embodiments, the one or more target travel trajectories may be selected from the at least one travel trajectory based on the vanishing point and a count of the one or more lanes $N_{TL}$ (also referred to as a total number of lanes herein) on the road segment. For example, each determined target travel trajectory may be a travel trajectory parallel to the lane lines on the road segment and pass through (or approximately pass through) the vanishing point. In some embodiments, the determination of the one or more target travel trajectories may include one or more second iterations. Each second iteration may include one or more operations of 535 to 550. For illustration purposes, a current second iteration of the one or more second iterations is described hereinafter.

In 535, the processing device 120 (e.g., the travel trajectory determination module 450) (e.g., the processing circuits of the processor 220) may select a test travel trajectory among the at least one travel trajectory in the current second iteration.

In some embodiments, the at least one travel trajectory may include only one travel trajectory, and the travel trajectory may be designated as the test travel trajectory. Alternatively, the at least one travel trajectory may include a plurality of travel trajectories. The test travel trajectory may be selected from the travel trajectories randomly or according to a selection rule. For example, the processing device 120 may select a travel trajectory of the first vehicle that appears on the road segment as the test travel trajectory. As another example, the processing device 120 may randomly select one of the travel trajectories as the test travel trajectory.

In 540, the processing device 120 (e.g., the travel trajectory determination module 450) (e.g., the processing circuits of the processor 220) may determine whether a distance between the test travel trajectory and the vanishing point is smaller than a second threshold distance.

The distance between the test travel trajectory and the vanishing point may refer to a perpendicular distance from the vanishing point to the test travel trajectory. The second threshold distance may have any suitable value. For example, the second threshold distance may be equal to 5 pixels, 10 pixels, 15 pixels, 20 pixels, 25 pixels, or the like. In some embodiments, the second threshold distance may be in a range of 10 pixels to 15 pixels. The second threshold distance may be a default setting of the lane line identification system 100 or beset by a user manually. Alternatively, the second threshold distance may be determined by the processing device 120 according to different situations. In some embodiments, the second threshold distance may be equal to or different from the first threshold distance as described in connection with 520.

In some embodiments, in response to a determination that the distance between the test travel trajectory and the vanishing point is greater than the second threshold distance, the process 500 may proceed back to 535 to perform a next second iteration as shown in FIG. 5. For example, the processing device 120 may select a new travel trajectory among the at least one travel trajectory as a test travel trajectory in the next second iteration and repeat operation 535. The new travel trajectory may be a travel trajectory among the at least one travel trajectory that has not been selected as a test travel trajectory. If all of the at least one travel trajectory have been selected as a test travel trajectory, the process 500 may proceed back to 530. The processing device 120 may determine one or more new travel trajectories based on the images, and select a new travel trajectory among the one or more new travel trajectories as a test travel trajectory in the next second iteration. Alternatively, the process 500 may processed back to 510. The processing device 120 may obtain a plurality of new images of the road segment, and perform operations 530 and 535 on the new images to determine a new travel trajectory as a test travel trajectory in the next second iteration.

In response to a determination that the distance between the test travel trajectory and the vanishing point is or smaller than the second threshold distance, the process 500 may proceed to 545 and 550. In 545, the processing device 120 (e.g., the travel trajectory determination module 450) (e.g., the processing circuits of the processor 220) may designate the test travel trajectory as a target travel trajectory. Optionally, the processing device 120 may further store the target travel trajectory and information related to the target travel trajectory (e.g., coordinate of two end points of the target travel trajectory) to a storage device (e.g., the storage device 130, the storage 390, etc.).

In 550, the processing device 120 (e.g., the travel trajectory determination module 450) (e.g., the processing circuits of the processor 220) may determine whether a total count of target travel trajectories is equal to the $N_{TL}$.

The total count of target travel trajectories may include a count of the target travel trajectory determined in the current second iteration and each previous second iteration (if any). The $N_{TL}$ may be a default setting of the lane line identification system 100 or be inputted by a user manually. Alternatively, the $N_{TL}$ may be determined by the processing device 120. For example, the processing device 120 may analyze an image of the road segment (e.g., any one of the images obtained in 510) to determine the $N_{TL}$. As another example, the processing device 120 may determine the $N_{TL}$ based on the location of the road segment (or the image acquisition device) by retrieving a traffic database that stores road condition information.

In response to a determination that the total count of target travel trajectories is equal to the $N_{TL}$, the determination of the one or more target travel trajectories (e.g., the one or more second iterations) may be terminated, and the process 500 may proceed to 560. In response to a determination that the total count of target travel trajectories is not equal to the $N_{TL}$, the determination of the one or more target travel trajectories may continue, and the process 500 may proceed back to 535 to perform a next second iteration as shown in FIG. 5. For example, the processing device 120 may select a new travel trajectory among the at least one travel trajectory as a test travel trajectory in the next second iteration. The selection of a new travel trajectory may be performed in a similar manner as that described in connection with 540, and the descriptions thereof are not repeated here.

In some embodiments, before the next second iteration is performed, the processing device 120 may determine whether there is one or more travel trajectories located in a same lane as the target travel trajectory determined in the current second iteration. A travel trajectory located in a same lane as the target travel trajectory may refer to a travel trajectory whose horizontal distance to the target travel trajectory is smaller than a third threshold distance. The third threshold distance may have any suitable value. In some embodiments, the third threshold distance may be equal to or substantially equal to a width of a regular vehicle or half of a width of a regular lane in an image. The target travel trajectory and the travel trajectory may intersect with a reference straight line (e.g., the bottom edge of the target image), respectively, at a first intersection point and a second interesting point. The horizontal distance from the travel trajectory to the target travel trajectory may be measured by a distance between the first and second intersecting points. Further, if there is one or more travel trajectories located in a same lane as the target travel trajectory, the processing device 120 may remove the one or more travel trajectories located in a same lane as the target travel trajectory. The removed travel trajectories may not enter the next second iteration. The new travel trajectory may be selected in among one or more remaining travel trajectories.

In 560, the processing device 120 (e.g., the lane line determination module 440) (e.g., the processing circuits of the processor 220) may determine the plurality of lane lines among the plurality of candidate lane lines based on the one or more target travel trajectories.

Figure 8:
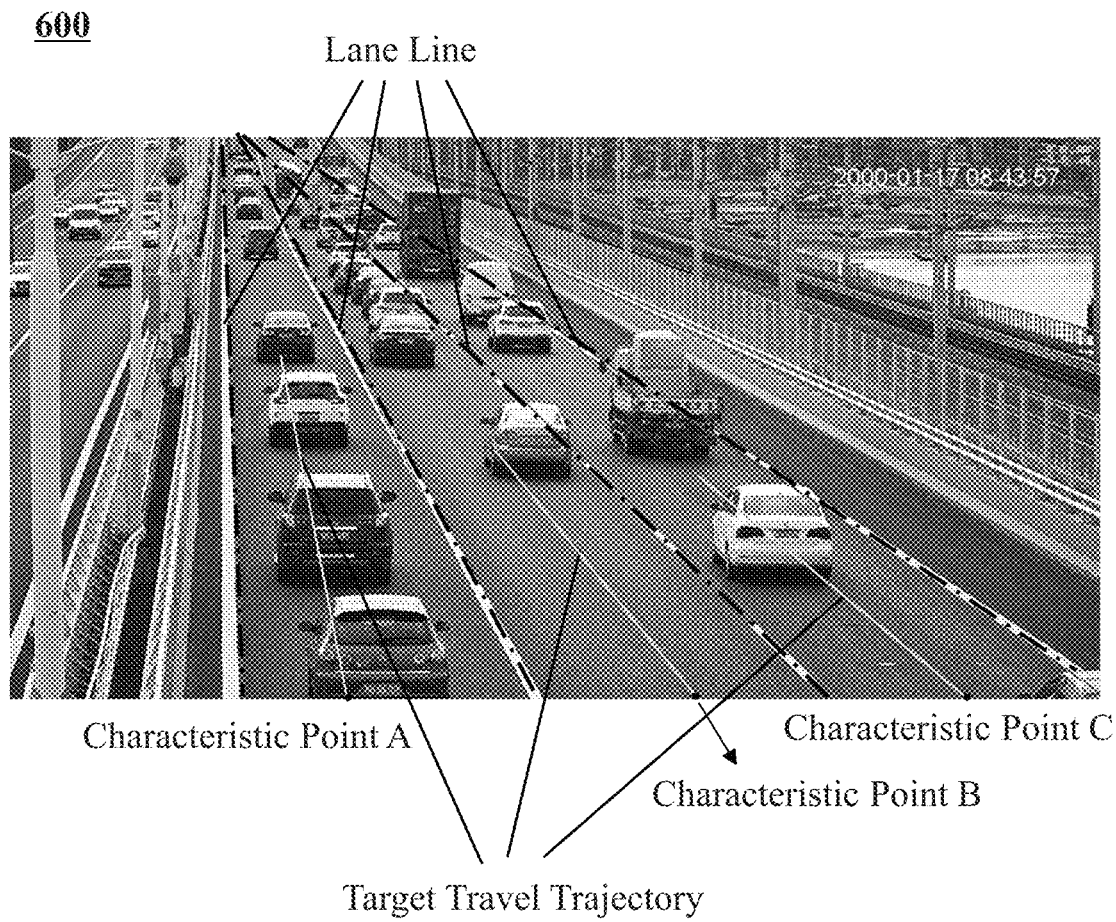
FIG. 8 is another target image illustrating example target travel trajectories, characteristic points of lanes, and lane lines in the target image of FIG. 6 according to some embodiments of the present disclosure.

In some embodiments, the processing device 120 may determine one or more characteristic points of the one or more lanes of the road segment based on the one or more target travel trajectories. The characteristic point(s) may include one or more intersecting points between the bottom edge of the target image and the one or more target travel trajectories. For example, FIG. 8 illustrates example target travel trajectories and example characteristic points A, B, and C in the target image 600. The characteristic points A, B, and C may be three intersecting points between the target travel trajectories in the target image 600 and the bottom edge of the target image 600. As described above, in some embodiments, each target travel trajectory may be a travel trajectory parallel to the lane lines on the road segment and pass through (or approximately pass through) the vanishing point. An intersecting point between a target travel trajectory and the bottom edge of the target image may represent a predicted middle point of a lane, and thereby may be regarded as a characteristic point of the lane.

The processing device 120 may then determine a plurality of target characteristic points of the lane(s) based on the characteristic point(s). A target characteristic point of a lane may represent a predicted interesting point between the bottom edge of the target image and a lane line of the lane. In some embodiments, the characteristic point(s) may include a plurality of characteristic point(s). For each pair of adjacent characteristic points of the characteristic points, the processing device 120 may determine a middle point of the pair of adjacent characteristic points as a target characteristic point. For a first characteristic point closest to a left edge of the target image among the characteristic points, the processing device 120 may determine a first point on the bottom edge of the target image as a target characteristic point, wherein the first point may be located on a left side of the first characteristic point and spaced apart from the first characteristic point by a first predetermined distance. For a second characteristic point closest to a right edge of the target image among the characteristic points, the processing device 120 may determine a second point on the bottom edge of the target image as a target characteristic point, wherein the second point may be located on a right side of the second characteristic point and spaced apart from the second characteristic point by a second predetermined distance. For example, referring to FIG. 8, a middle point between the characteristic points A and B, a middle point between the characteristic points B and C, a point located on the left side of the characteristic point A and have the first predetermined distance to the characteristic point A, and a point located on the right side of the characteristic point C and have the second predetermined distance to the characteristic point C may be designated as a plurality of target characteristic points.

In some embodiments, the first predetermined distance and/or the second predetermined distance may be a default setting of the lane line identification system 100 or be inputted by a user. Alternatively, the first predetermined distance and/or the second predetermined distance may be determined by the processing device 120 according to different situations. In some embodiments, the first predetermined distance and/or the second predetermined distance may be equal to or substantially equal to a width of a regular vehicle or half of a width of a regular lane in an image. Alternatively, the first predetermined distance and/or the second predetermined distance may be determined by multiplying to a width of a regular vehicle or half of a width of a regular lane in an image with a coefficient. The coefficient may be associated with a road condition of the road segment. For example, the coefficient may be smaller than 1 (e.g., equal to ⅔) if the road segment is narrow (e.g., a width of which is smaller than a threshold width). The coefficient may be greater than 1 (e.g., equal to 1.2) if the road segment is wide (e.g., a width of which is greater than a threshold width). In some embodiments, there is only one lane on the road segment and the characteristic point(s) may only include one characteristic point of the lane. The processing device 120 may determine a first point and a second point of the characteristic point as the target characteristic points of the lane.

Further, the processing device 120 may determine the lane lines among the candidate lane lines based on the target characteristic points. In some embodiments, for each target characteristic point, the processing device 120 may determine a distance from the target characteristic point to each candidate lane line. A distance from a target characteristic point to a candidate lane line may refer to a perpendicular distance from the target characteristic point to the candidate lane line. Alternatively, a distance from a target characteristic point to a candidate lane line may refer to a distance from the target characteristic point to an intersecting point between the candidate lane line and the bottom edge of the target image. For each target characteristic point, the processing device 120 may select a candidate lane line among the candidate lane lines that the shortest distance to the target characteristic point. The processing device 120 may further designate the plurality of selected candidate lane lines as the plurality of lane lines. In some embodiments, the processing device 120 may label the identified lane lines on the target image. For example, as shown in FIG. 8, the identified lane lines are labeled as dotted lines in the target image. Optionally, the labeled target image may be transmitted to a user terminal (e.g., user terminal 140) for display. In some embodiments, the identified lane lines may be used in various areas, such as traffic monitoring. For example, the image acquisition device may acquire images of the road segment in real-time or periodically. The processing device 120 may detect vehicle violation on the road segment based on the images and the identified lane lines on the road segment.

It should be noted that the above description regarding the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. The operations of the illustrated process presented above are intended to be illustrative. In some embodiments, the process 500 may be accomplished with one or more additional operations not described, and/or without one or more of the operations discussed. Additionally, the order in which the operations of the process 500 as illustrated in FIG. 5 and described above is not intended to be limiting.

In some embodiments, operations 535 to 550 may be omitted. The processing device 120 (e.g., the travel trajectory determination module 450) may determine the one or more target travel trajectories among the at least one travel trajectory based on the $N_{TL}$ and/or the vanishing point by performing one or more first iterations. For illustration purposes, a current first iteration of the one or more first iterations is described as an example.

In the current first iteration, the processing device 120 may divide the at least one travel trajectory in the current first iteration into one or more subgroups, each which corresponds to a lane of the lane(s). Each subgroup may include one or more travel trajectories of vehicles located in the corresponding lane. The count of the subgroup(s) may be equal to the count of the lane(s) of the road segment if there are one or more vehicles travels on each of the lane(s). The count of the subgroup(s) may be smaller than the count of the lane(s) if there is no vehicle travels on one or more of the lane(s).

In some embodiments, there are a plurality of travel trajectories. The processing device 120 may divide the travel trajectories into the subgroup(s) based on a distance between each pair of travel trajectories. For example, if a distance between a pair of travel trajectories is smaller than a threshold distance, the pair of travel trajectories may be divided into a same subgroup. In some embodiments, there are a plurality of lanes in the road segment. The processing device 120 may first segment the target image into a plurality of sub-areas to represent the plurality of lanes. The target image may be segmented evenly into the sub-areas having the same shape and size. Alternatively, the target image may be segmented unevenly into sub-areas having different shapes and/or sizes. For example, the target image may be segmented into a left area, a right area, and a middle area between the left and right areas, wherein the size of the middle area is larger than the left and right areas. Further, for each travel trajectory, the processing device 120 may determine a lane at which the travel trajectory locates and divide the travel trajectory into the subgroup corresponding to the determined lane. Taking a travel trajectory as an instance, the processing device 120 may determine a lane at which each pixel of the travel trajectory locates based on a coordinate of each pixel. A lane at which most of the pixels of the travel trajectory locates may be determined as the lane at which the travel trajectory locates.

In the current first iteration, the processing device 120 may then select a travel trajectory from each subgroup. In some embodiments, the processing device 120 may select a travel trajectory from each subgroup randomly or according to a selection rule. For example, the processing device 120 select a travel trajectory of the first vehicle that appears on the road segment from each subgroup. As another example, in each group, the processing device 120 may select a travel trajectory that has a distance to the vanishing point below the first threshold distance, or select a travel trajectory that has the shortest distance to the vanishing point.

Further, the processing device 120 may determine whether a count of the one or more selected travel trajectories is equal to the $N_{TL}$. It can be speculated that each lane has a corresponding travel trajectory if the count of the one or more selected travel trajectories is equal to the $N_{TL}$. In this cases, the lane line identification based on the one or more selected travel trajectories may have a high or desirable accuracy. Thus, in response to a determination that the count of the one or more selected travel trajectories is equal to the $N_{TL}$, the processing device 120 may designate the one or more selected travel trajectories as the one or more target travel trajectories.

On the other hand, it can be speculated that not each lane has a corresponding travel trajectory if count of the one or more selected travel trajectories is not equal to the $N_{TL}$. In this cases, the lane line identification based on the one or more selected travel trajectories may not have a high or desirable accuracy. Thus, in response to a determination that the count of the one or more selected travel trajectories is not equal to the $N_{TL}$, the processing device 120 may update the plurality of images of the road segment. The updated images may include one or more other images of the road segment acquired by the image acquisition device. For example, the updated images may include one or more images acquired by the image acquisition device before or after the original images obtained in 510. Optionally, the updated images may include one or more of the original images obtained in the 510. The processing device 120 may determine at least one updated travel trajectory based on the plurality of updated images. The at least one updated travel trajectory may be determined based on the updated images in a similar manner with as determining the at least one travel trajectory as described in connection with operation 530. The processing device 120 may also designate the at least one updated travel trajectory as at least one travel trajectory in a next first iteration, and perform the next first iteration based on the at least one updated travel trajectory. The determination of the one or more target travel trajectories may be terminated until the selected travel trajectories in a certain first iteration is equal to $N_{TL}$.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the example embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., $\pm 1\%$, $\pm 5\%$, $\pm 10\%$, or $\pm 20\%$) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In addition, a judgment condition in the present disclosure is provided for illustration purposes and may be modified according to different situations. For example, a judgment condition that "a distance is greater than a threshold distance" may further include or exclude a condition that "the distance is equal to the threshold distance".

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system for identifying a plurality of lane lines on a road segment, comprising:
    at least one storage medium storing a set of instructions; and
    at least one processor in communication with the at least one storage medium, to execute the instructions to direct the system to perform operations including:
        obtaining a plurality of images of the road segment captured by an image acquisition device mounted above the road segment, the road segment having one or more lanes and one or more vehicles travelling on the road segment;
        identifying a plurality of reference straight lines from a target image of the plurality of images of the road segment;
        determining, based on the plurality of reference straight lines, a vanishing point at which the plurality of lane lines intersect in the target image;
        determining, among the plurality of reference straight lines, a plurality of candidate lane lines based on the vanishing point;
        determining at least one travel trajectory of at least one of the one or more vehicles based on the plurality of images;
        determining, among the at least one travel trajectory, one or more target travel trajectories based on at least one of the vanishing point or a count of the one or more lanes; and
        determining, among the plurality of candidate lane lines, the plurality of lane lines based on the at least one target travel trajectory.

2. The system of claim 1, wherein to determine the vanishing point based on the plurality of reference straight lines, the at least one processor is further configured to direct the system to perform additional operations including:
    determining a plurality of intersecting points between the plurality of reference straight lines;
    for each of the plurality of intersecting points, determining a distance from the intersecting point to each of the plurality of reference straight lines; and
    determining, based on the distances from the intersecting points to the plurality of reference straight lines; the vanishing point.

3. The system of claim 2; wherein to determine the vanishing point based on the distances from the intersecting points to the plurality of reference straight lines, the at least one processor is further configured to direct the system to perform additional operations including:
    for each of the plurality of intersecting points, determining a plurality of target straight lines among the plurality of reference straight lines, a distance from the intersecting point to each of the corresponding target straight lines being smaller than a first threshold distance;
    identifying, among the plurality of intersecting points, an intersecting point that corresponds to the most target straight lines; and
    designating the identified intersecting point as the vanishing point.

4. The system of claim 3, wherein to determine the plurality of candidate lane lines based on the vanishing point, the at least one processor is further configured to direct the system to perform additional operations including:
    designating the target straight lines corresponding to the vanishing point as the candidate lane lines.

5. The system of claim 1, wherein to determine one or more target travel trajectories among the at least one travel trajectory, the at least one processor is further configured to direct the system to perform additional operations including:
    performing one or more first iterations, each current first iteration of the one or more first iterations comprising:
        dividing the at least one travel trajectory in the current first iteration into one or more subgroups, each of the one or more subgroups corresponding to a lane of the one or more lanes;
        selecting a travel trajectory from each of the one or more subgroups;
        determining whether a count of the one or more selected travel trajectories is equal to the count of the one or more lanes; and
        in response to a determination that the count of the one or more selected travel trajectories is equal to the count of the one or more lanes, designating the one or more selected travel trajectories as the one or more target travel trajectories.

6. The system of claim 5, wherein each current first iteration further comprises:
    in response to a determination that the count of the one or more selected travel trajectories is not equal to the count of the one or more lanes, updating the plurality of images of the road segment;
    determining, based on the plurality of updated images, at least one updated travel trajectory; and
    designating the at least one updated travel trajectory as at least one travel trajectory in a next first iteration.

7. The system of claim 1, wherein to determine one or more target travel trajectories among the at least one travel trajectory, the at least one processor is further configured to direct the system to perform additional operations including:
    performing one or more second iterations, each current second iteration of the one or more second iterations comprising:
        selecting, among the at least one travel trajectory in the current second iteration, a test travel trajectory;
        determining whether a distance between the test travel trajectory and the vanishing point is smaller than a second threshold distance;
        in response to a determination that the distance is smaller than the second threshold distance, designating the test travel trajectory as a target travel trajectory;
        determining whether a total count of target travel trajectories is equal to the count of the one or more lanes; and
        in response to a determination that the total count is equal to the count of the one or more lanes of the road segment, terminating the one or more second iterations.

8. The system of claim 7, wherein the at least one travel trajectory in the current second iteration includes a plurality of travel trajectories, each current second iteration further comprises:
in response to a determination that the total count is not equal to the count of the one or more lanes, selecting a new travel trajectory as a test travel trajectory in a next second iteration.

9. The system of claim 1, wherein to determine the plurality of lane lines among the plurality of candidate lane lines based on the one or more target travel trajectories, the at least one processor is further configured to direct the system to perform additional operations including:
determining one or more characteristic points of the one or more lanes of the road segment, the one or more characteristic points being one or more intersecting points between a bottom edge of the target image and the one or more target travel trajectories;
determining, based on the one or more characteristic points, a plurality of target characteristic points of the one or more lanes; and
determining, among the plurality of candidate lane lines, the plurality of lane lines based on the plurality of target characteristic points.

10. The system of claim 9, wherein to determine the plurality of lane lines among the plurality of candidate lane lines based on the plurality of target characteristic points, the at least one processor is further configured to direct the system to perform additional operations including:
for each of the plurality of target characteristic points, determining a distance from each of the candidate lane lines to the target characteristic point;
for each of the plurality of target characteristic points, selecting, among the plurality of candidate lane lines, a candidate lane line that has the shortest distance to the target characteristic point; and
designating the plurality of selected candidate lane lines as the plurality of lane lines.

11. The system of claim 9, wherein the one or more characteristic points include a plurality of characteristic points, and to determine the plurality of target characteristic points based on the plurality of characteristic points, the at least one processor is further configured to direct the system to perform additional operations including:
for each pair of adjacent characteristic points of the plurality of characteristic points, determining a middle point of the pair of adjacent characteristic points;
for a first characteristic point closest to a left edge of the target image among the characteristic points, determining a first point on the bottom edge of the target image, the first point being located on a left side of the first characteristic point and spaced apart from the first characteristic point by a first predetermined distance;
for a second characteristic point closest to a right edge of the target image among the characteristic points, determining a second point on the bottom edge of the target image, the second point being located on a right side of the second characteristic point and spaced apart from the second characteristic point by a second predetermined distance; and
designating the one or more middle points, the first point, and the second point as the plurality of target characteristic points.

12. The system of claim 1, wherein the determining the vanishing point at which the plurality of lane line intersect in the target travel trajectory is based on a random sample consensus algorithm.

13. A method for identifying a plurality of lane lines on a road segment, the method being implemented on a computing device having at least one processor and at least one storage medium, comprising:
obtaining a plurality of images of the road segment captured by an image acquisition device mounted above the road segment, the road segment having one or more lanes and one or more vehicles travelling on the road segment;
identifying a plurality of reference straight lines from a target image of the plurality of images of the road segment;
determining, based on the plurality of reference straight lines, a vanishing point at which the plurality of lane lines intersect in the target image;
determining, among the plurality of reference straight lines, a plurality of candidate lane lines based on the vanishing point;
determining at least one travel trajectory of at least one of the one or more vehicles based on the plurality of images;
determining, among the at least one travel trajectory, one or more target travel trajectories based on at least one of the vanishing point or a count of the one or more lanes; and
determining, among the plurality of candidate lane lines, the plurality of lane lines based on the at least one target travel trajectory.

14. The method of claim 13, wherein the determining of the vanishing point based on the plurality of reference straight lines includes:
determining a plurality of intersecting points between the plurality of reference straight lines;
for each of the plurality of intersecting points, determining a distance from the intersecting point to each of the plurality of reference straight lines; and
determining, based on the distances from the intersecting points to the plurality of reference straight lines, the vanishing point.

15. The method of claim 14, wherein the determining of the vanishing point based on the distances from the intersecting points to the plurality of reference straight lines includes:
for each of the plurality of intersecting points, determining a plurality of target straight lines among the plurality of reference straight lines, a distance from the intersecting point to each of the corresponding target straight lines being smaller than a first threshold distance;
identifying, among the plurality of intersecting points, an intersecting point that corresponds to the most target straight lines; and
designating the identified intersecting point as the vanishing point.

16. The method of claim 13, wherein the determining of the one or more target travel trajectories among the at least one travel trajectory includes:
performing one or more first iterations, each current first iteration of the one or more first iterations comprising:
dividing the at least one travel trajectory in the current first iteration into one or more subgroups, each of the one or more subgroups corresponding to a lane of the one or more lanes;
selecting a travel trajectory from each of the one or more subgroups;

determining whether a count of the one or more selected travel trajectories is equal to the count of the one or more lanes; and in response to a determination that the count of the one or more selected travel trajectories is equal to the count of the one or more lanes, designating the one or more selected travel trajectories as the one or more target travel trajectories.

17. The method of claim 16, wherein each current first iteration further comprises:

in response to a determination that the count of the one or more selected travel trajectories is not equal to the count of the one or more lanes, updating the plurality of images of the road segment;

determining, based on the plurality of updated images, at least one updated travel trajectory; and designating the at least one updated travel trajectory as at least one travel trajectory in a next first iteration.

18. The method of claim 13, wherein the determining of the one or more target travel trajectories among the at least one travel trajectory includes:

performing one or more second iterations, each current second iteration of the one or more second iterations comprising:

selecting, among the at least one travel trajectory in the current second iteration, a test travel trajectory;

determining whether a distance between the test travel trajectory and the vanishing point is smaller than a second threshold distance;

in response to a determination that the distance is smaller than the second threshold distance, designating the test travel trajectory as a target travel trajectory;

determining whether a total count of target travel trajectories is equal to the count of the one or more lanes; and in response to a determination that the total count is equal to the count of the one or more lanes of the road segment, terminating the one or more second iterations.

19. The method of claim 18, wherein the at least one travel trajectory in the current second iteration includes a plurality of travel trajectories, each current second iteration further comprises:

in response to a determination that the total count is not equal to the count of the one or more lanes, selecting a new travel trajectory as a test travel trajectory in a next second iteration.

20. A non-transitory readable medium, comprising at least one set of instructions for identifying a plurality of lane lines on a road segment, wherein when executed by at least one processor of a system, the at least one set of instructions directs the system to perform a method, the method comprising:

obtaining a plurality of images of the road segment captured by an image acquisition device mounted above the road segment, the road segment having one or more lanes and one or more vehicles travelling on the road segment;

identifying a plurality of reference straight lines from a target image of the plurality of images of the road segment;

determining, based on the plurality of reference straight lines, a vanishing point at which the plurality of lane lines intersect in the target image;

determining, among the plurality of reference straight lines, a plurality of candidate lane lines based on the vanishing point;

determining at least one travel trajectory of at least one of the one or ore vehicles based on the plurality of images;

determining, among the at least one travel trajectory, one or more target travel trajectories based on at least one of the vanishing point or a count of the one or more lanes; and determining, among the plurality of candidate lane lines, the plurality of lane lines based on the at least one target travel trajectory.

* * * * *